US009619689B2

(12) United States Patent
Schneider et al.

(10) Patent No.: US 9,619,689 B2
(45) Date of Patent: Apr. 11, 2017

(54) SYSTEM AND METHOD OF USING AN ELECTRIC FIELD DEVICE

(71) Applicant: QUALCOMM Incorporated, San Diego, CA (US)

(72) Inventors: John K. Schneider, Williamsville, NY (US); Jack C. Kitchens, Buffalo, NY (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/760,954

(22) Filed: Feb. 6, 2013

(65) Prior Publication Data

US 2013/0200907 A1 Aug. 8, 2013

Related U.S. Application Data

(60) Provisional application No. 61/595,322, filed on Feb. 6, 2012.

(51) Int. Cl.
*G01N 27/22* (2006.01)
*G06F 19/10* (2011.01)
*G06K 9/00* (2006.01)
*G06F 3/044* (2006.01)
*G06T 5/00* (2006.01)

(52) U.S. Cl.
CPC ........... *G06K 9/0002* (2013.01); *G06F 3/044* (2013.01); *G06K 9/0008* (2013.01); *G06T 5/002* (2013.01)

(58) Field of Classification Search
CPC ......... G06K 9/00006–9/0012; G01R 27/2605; G06F 19/10; G06T 5/001–5/002

USPC ................ 324/656, 658–690; 382/124, 264; 345/173–178

See application file for complete search history.

(56) References Cited

U.S. PATENT DOCUMENTS

| | | | |
|---|---|---|---|
| 4,811,414 A * | 3/1989 | Fishbine et al. | 382/272 |
| 6,411,727 B1 * | 6/2002 | Harkin | 382/124 |
| 6,518,820 B2 * | 2/2003 | Gremm | H03K 17/962 327/432 |
| 6,714,666 B1 * | 3/2004 | Morimura et al. | 382/124 |
| 7,391,006 B2 | 6/2008 | Cheng et al. | |
| 7,773,228 B1 | 8/2010 | Hollingsworth et al. | |

(Continued)

FOREIGN PATENT DOCUMENTS

EP    0791899 A2    8/1997

OTHER PUBLICATIONS

International Search Report and Written Opinion—PCT/US2013/024973—ISA/EPO—May 15, 2013.

(Continued)

*Primary Examiner* — Huy Q Phan
*Assistant Examiner* — David Frederiksen
(74) *Attorney, Agent, or Firm* — Weaver Austin Villeneuve & Sampson LLP

(57) ABSTRACT

A biometric scanner having an electric field device and a method of using that scanner are disclosed. The electric field device (a) has no electric field generator or an electric field generator that is prevented from providing an electric field to a biometric object, such as a finger, and (b) has an electric field sensor array comprised of a plurality of electric field sensors. Capacitance readings from the sensor array are used to generate values that are attributed to locations corresponding to the sensors.

10 Claims, 9 Drawing Sheets

(56) References Cited

U.S. PATENT DOCUMENTS

| | | | |
|---|---|---|---|
| 8,441,459 B2* | 5/2013 | Chen | G06F 3/0412 345/174 |
| 8,618,865 B1* | 12/2013 | Lu | 327/517 |
| 2004/0099065 A1 | 5/2004 | Deconde et al. | |
| 2005/0094855 A1* | 5/2005 | Proano et al. | 382/124 |
| 2007/0024546 A1* | 2/2007 | Jang et al. | 345/78 |
| 2007/0231790 A1 | 10/2007 | Su | |
| 2008/0208495 A1* | 8/2008 | Xu | G06K 9/0002 702/65 |
| 2009/0016571 A1* | 1/2009 | Tijerina et al. | 382/104 |
| 2009/0079707 A1* | 3/2009 | Kaehler | G06F 3/044 345/174 |
| 2009/0256815 A1* | 10/2009 | Westerinen | G06F 3/044 345/174 |
| 2010/0276604 A1* | 11/2010 | Okada | 250/370.09 |
| 2011/0215150 A1* | 9/2011 | Schneider et al. | 235/439 |
| 2011/0221684 A1* | 9/2011 | Rydenhag | G06F 3/041 345/173 |
| 2011/0242044 A1* | 10/2011 | Liu | G06F 3/0416 345/174 |
| 2012/0050220 A1* | 3/2012 | Liu | G06F 3/044 345/174 |
| 2012/0144920 A1* | 6/2012 | Wong et al. | 73/632 |
| 2013/0106758 A1* | 5/2013 | Radivojevic | G06F 3/044 345/174 |
| 2016/0283767 A1 | 9/2016 | Schneider et al. | |

OTHER PUBLICATIONS

Supplementary European Search Report—EP13746756, Search Authority—The Hague, May 10, 2016.
International Preliminary Report on Patentability—PCT/US2013/024973, The International Bureau of WIPO—Geneva, Switzerland, Aug. 25, 2014.

* cited by examiner

SYSTEM AND METHOD OF USING AN ELECTRIC FIELD DEVICE

CROSS-REFERENCE TO RELATED APPLICATION

This application claims the benefit of priority to U.S. provisional patent application Ser. No. 61/595,322, filed on Feb. 6, 2012.

FIELD OF THE INVENTION

The invention relates to fingerprint scanning devices that function by means of measuring the electric field associated with the distributed charge on a biometric object, such as a finger.

BACKGROUND OF THE INVENTION

Since the 1800's fingerprint information has been collected from human fingers and hands by means of ink and paper. For the purposes of this document, the term fingerprint is used to mean the skin surface friction ridge detail of a single fingerprint, partial fingerprint or any portion of the skin surface friction ridge up to and including the entire hand or foot. In recent years various electronic fingerprint scanning systems have been developed utilizing optical, capacitance, direct pressure, thermal, and acoustic methods. Methods based upon acoustics, ultrasound, capacitance, and electric field measurement have proven to be the most accurate, as they are virtually immune to the effects of grease, dirt, paint, ink, and other image contaminants. Capacitance sensors may also offer additional advantage in that they may be able to achieve improved imaging in cases where poor acoustic impedance matching between the friction skin of the fingerprint and the scanner's platen are present, such as may be encountered when the skin on the finger is very dry.

The electric field method employs a transducer that capacitively couples the finger to an array of electric field measuring devices. The electric field may be a static field or one that employs a generating device that is coupled to the finger by contact with an electrode. Although the electric field is nearly uniform across the finger, there are variations in the electric field that give rise to differences in the measured electric field. For example, when a ridge of the friction skin of the finger is present, the measured electric field will be different than when a valley of the friction skin is present. Graphically displaying this information creates a contour map of the object (human finger or skin surface) that is in contact with the scanner surface. For example, the depth of any gap structure, such as the ridges and valleys of the fingerprint, may be displayed as a gray-scale bitmap image. Measuring the electric field via the capacitance coupling to the platen surface makes use of the fact that the electric field is a function of the distance between capacitance plates, i.e., the TFT input pad and the skin of the finger. Ridges of the fingerprint are closer to the input pad and valleys are places where the skin is farther away from the TFT input electrode pad, and thus differing electric field measurements that can be used to identify the location of the ridges and valleys of the fingerprint.

SUMMARY OF THE INVENTION

The invention may be embodied as a biometric scanner having an electric field device and a computer coupled to a sensor array. The electric field device (a) has no electric field generator or an electric field generator that is prevented from providing an electric field to a biometric object, such as a finger, and (b) has an electric field sensor array comprised of a plurality of electric field sensors. The computer is communicatively coupled to the sensor array in order to receive capacitance readings from the sensors. The computer is programmed to process the capacitance readings as follows:
(i) identify a particular one of the electric field sensors that is providing a capacitance reading;
(ii) sum the capacitance reading of the identified electric field sensor with capacitance readings from adjacent electric field sensors;
(iii) divide the sum by the number of sensors contributing to that sum to provide a value;
(iv) attribute the value to the identified sensor;
(v) repeat steps (i) through (iv) until a value has been attributed to all sensors.

The computer may be further programmed to create an image of the biometric object using the values attributed to each sensor. The computer may be further programmed to use the values in determining whether the biometric object matches information in a database.

The invention may be embodied as a method of scanning a biometric object. Such a method may:
(i) provide 100 an electric field device (a) having no electric field generator or an electric field generator that is prevented from providing an electric field to a biometric object, and (b) having an electric field sensor array comprised of a plurality of electric field sensors;
(ii) provide 103 a biometric object in contact with the electric field device;
(iii) identify 106 a particular one of the electric field sensors that is providing a capacitance reading;
(iv) sum 109 the capacitance reading of the identified electric field sensor with capacitance readings from adjacent electric field sensors;
(v) divide the sum by the number of sensors contributing to that sum to provide a value;
(vi) attribute 112 the value to the identified sensor;
(vii) repeat 115 steps (iii) through (vi) until a value has been attributed to all sensors; and
(viii) provide 118 the values as being representative of the biometric object.

The method may further comprise accepting the provided values and using the values to generate a visual image of the biometric object. The method may further comprise accepting the provided values and using the values to determine whether the biometric object matches information in a database.

BRIEF DESCRIPTION OF THE DRAWINGS

For a fuller understanding of the nature and objects of the invention, reference should be made to the accompanying drawings and the subsequent description. Briefly, the drawings are.

Figure 1:
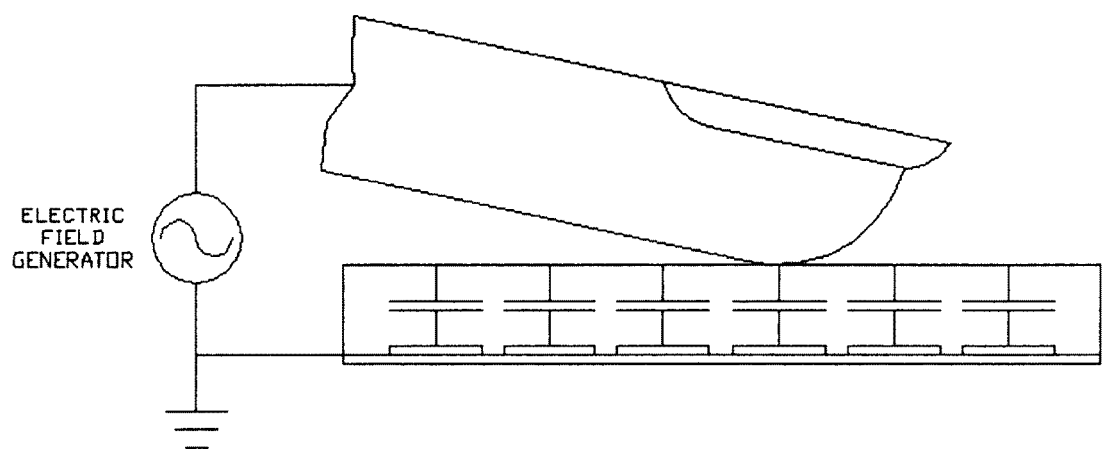
FIG. 1 is a simple diagram of an electric field biometric scanner mechanism showing the source of charge and the distributed capacitance layer that is the sensor's outer platen surface.
Figure 2:
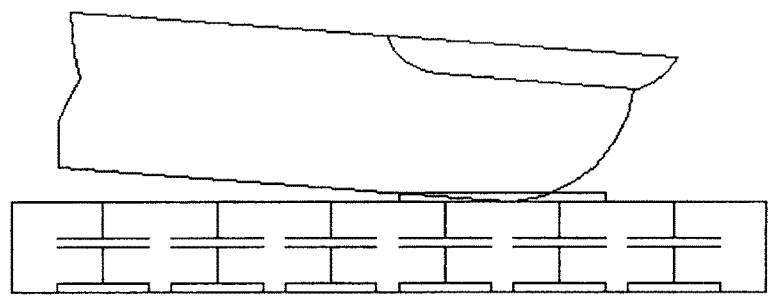
FIG. 2 is a simplified schematic diagram showing an electric field biometric scanner measurement circuit that receives the electric charge to measure. The finger is simply shown as a node in the circuit between the detector and the electric field source.
Figure 3:
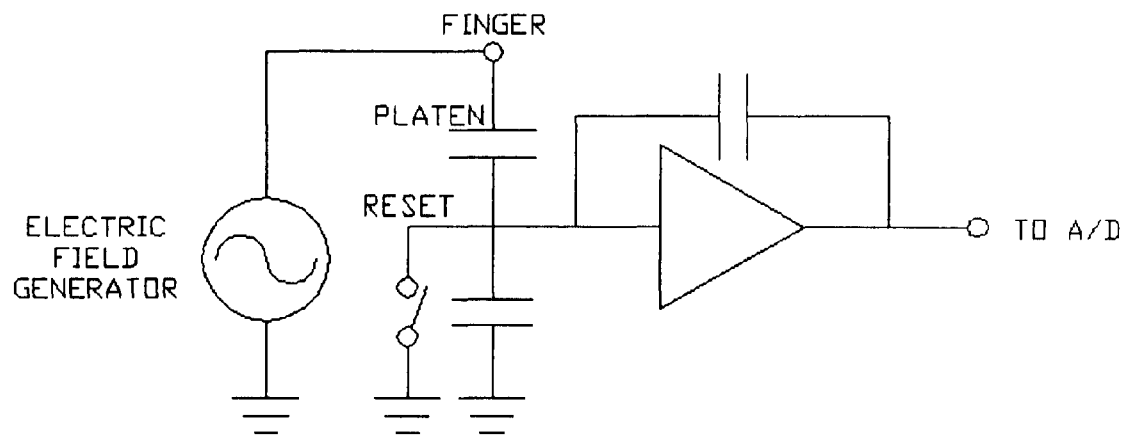
FIG. 3 is a simplified schematic diagram showing an electric field biometric scanner measurement circuit that receives the electric charge to measure. The finger is shown bridging multiple pixel nodes in the detection circuit; finger resistance shorts between adjacent capacitors.
Figure 4:
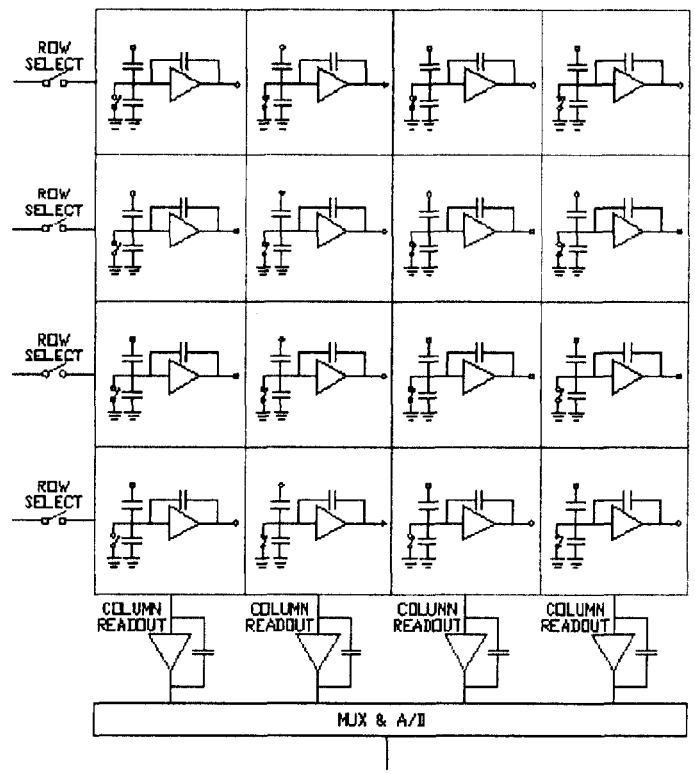
FIG. 4 depicts an array of electric field sensors (TFT or CMOS).
Figure 5:
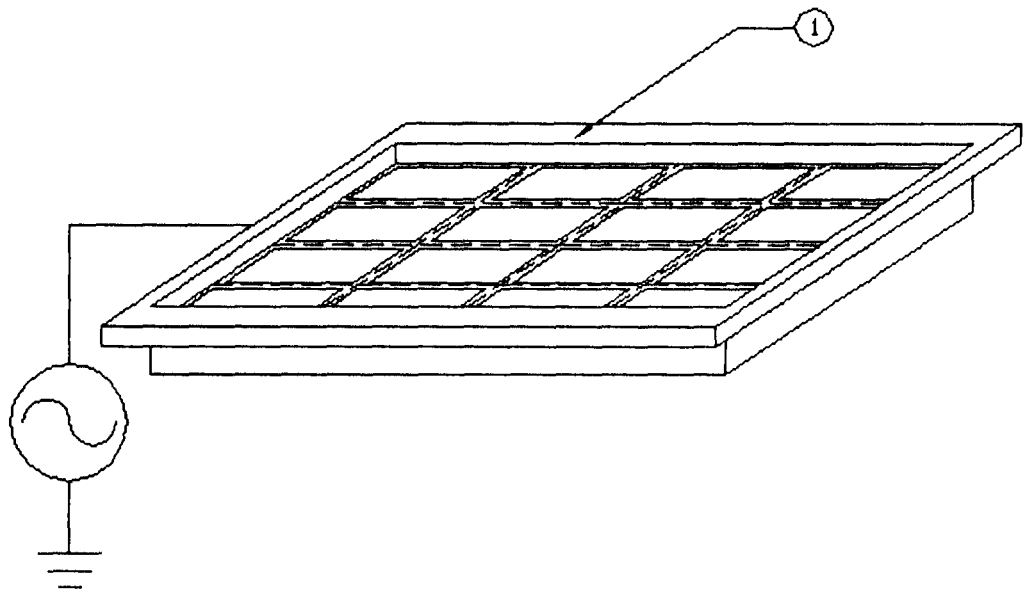
FIG. 5 shows an electric field sensor array configured as an electric field type fingerprint scanner.
Figure 6:
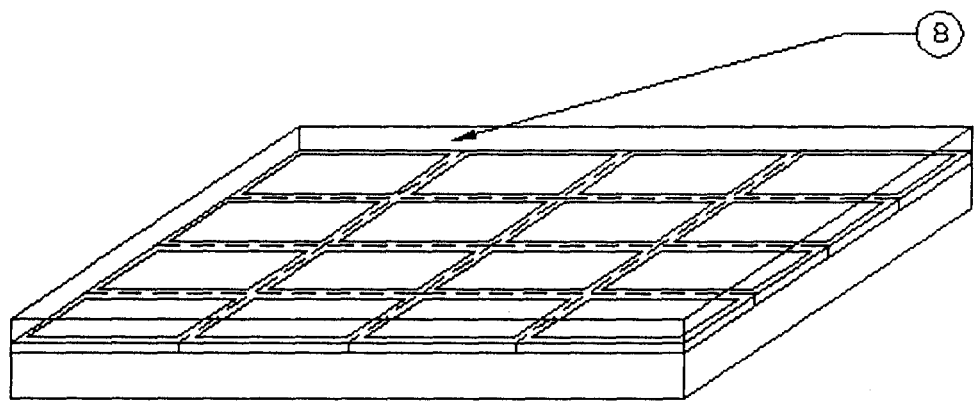
FIG. 6 shows an electric field sensor array configured as a capacitance type fingerprint scanner.
Figure 7:
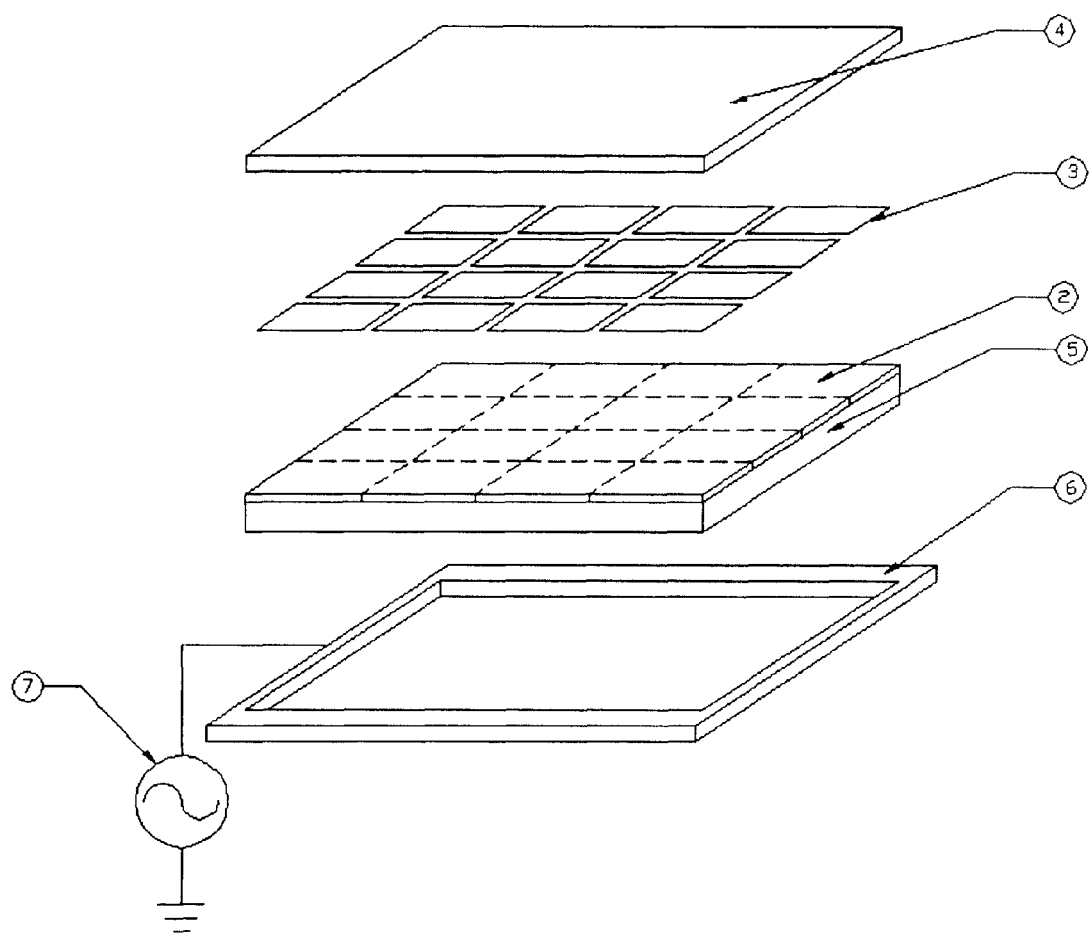
FIG. 7 is an exploded view of the scanner depicted in FIG. 5.
Figure 8:
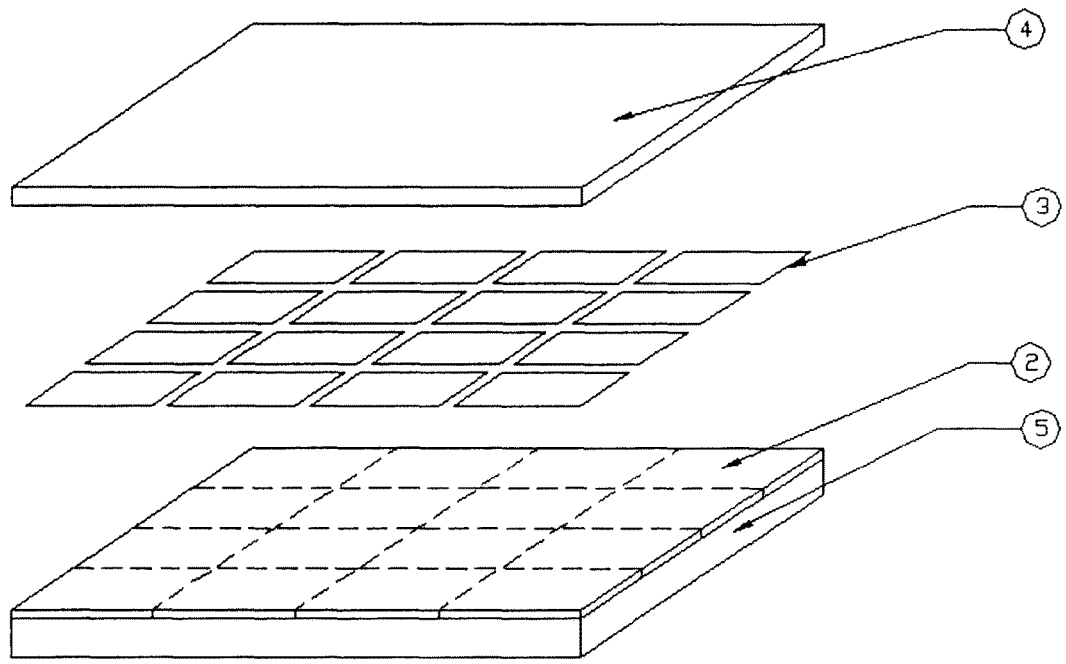
FIG. 8 is an exploded view of the scanner depicted in FIG. 6.

In the figures, certain reference numbers appear. These reference numbers indicate:
1 electric field scanner
2 TFT circuits
3 electrode array
4 dielectric layer
5 TFT substrate
6 antenna or excitation bus
7 excitation source (electric field generator)
8 capacitance scanner
9 finger
10 resistance path through the finger
11 capacitance plate (part of body conductive finger surface)
12 capacitance through the dielectric layer 4 from the electrode 3 to the finger 9
13 schematic of finger friction skin resistance and sensor capacitances for a plurality of contact nodes on the platen with the node of interest indicated
14 sensor capacitance between any sensor element of the electrode array 3 and the finger 9
15 skin resistance

FURTHER DESCRIPTION OF THE INVENTION

The invention may be embodied as a method of operating an electric field biometric scanner. FIGS. 1-5, 7 and 9 depict an electric field finger scanner, when operated according to the prior art. Such a scanner measures the local electric field coming from the surface of a biometric object, such as skin that is in contact with a dielectric layer serving as an imaging platen. The scanner includes (a) an electric field excitation generator, (b) an array of electrodes, (c) a dielectric layer covering the electrode array, and (d) electric field sensors electrically connected to the electrode array.

Figure 9:
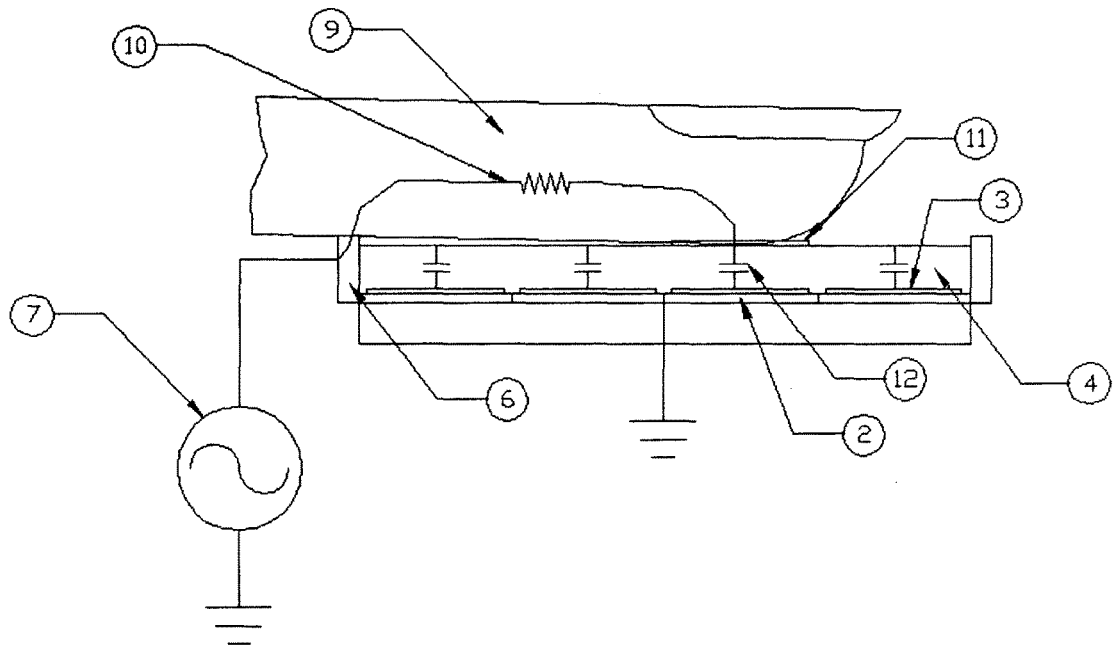
FIG. 9 is a diagram of the operation of the electric field type fingerprint scanner.
Figure 11:
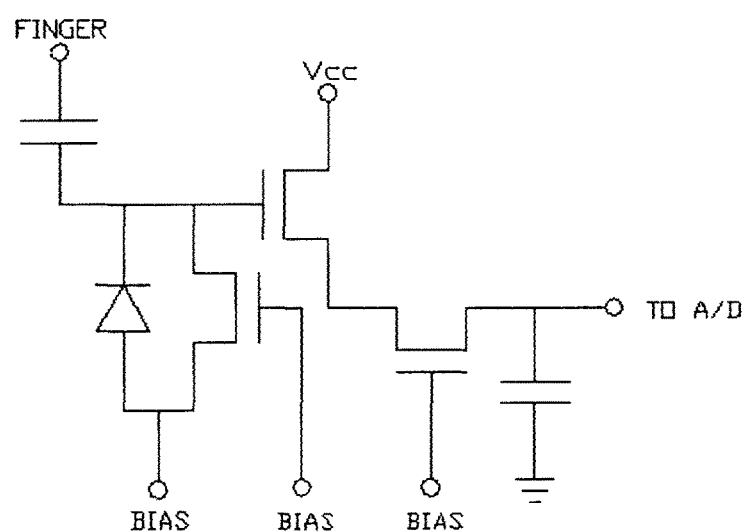
FIG. 11 depicts a TFT electric field detection pixel schematic.

FIGS. 1 through 9 show aspects of an electric field scanner. For the purpose of clarity, most of the discussion will reference FIG. 9. In FIG. 9, there is shown a voltage source 7 that radiates via an antenna (or bus) 6 that is in contact with the finger 9. The electric field conducts through the finger resistance 10 and emerges through the friction skin surface that is in contact with the dielectric surface 4 of a fingerprint reader 1, where the dielectric surface 4 is disposed uniformly over an array of electrodes 3, each connected to an electric field detecting and measuring circuit in an array of such circuits 2 of a TFT. The individual circuits may be row and column addressed and read to provide information to a computer system that displays the area read and the electrical field variation that is associated with each pixel circuit. The circuit for an individual pixel on a TFT is shown in the schematic diagram that is FIG. 11. As is known in the prior art, the electric field coming from the fingerprint ridges is stronger than that coming from the fingerprint valleys, and the measured values can by collectively displayed as an image that is a true representation of the fingerprint.

To operate the fingerprint scanner according to the prior art, the user places a finger 9 in contact with the dielectric platen surface 4, while also contacting the electric field generator's (i.e., transmitter's) antenna (or excitation bus) 6 that may take the form of a metal ring that is the perimeter of the fingerprint platen area. The finger 9 receives and radiates the electric field through the dielectric to the pixel electrode plates 3 that are attached to the electric field detecting circuits 2. The electric field varies in intensity in direct correlation with the finger's fingerprint valleys and ridges. After detecting and measuring this electric field variation at each electric field sensor 2, the sensor outputs are read out in row and column fashion to allow the reading electronic system to reconstruct a grayscale fingerprint image analogous to the variations in the electric field radiating from the finger's ridge and valley skin surface.

In a method according to the invention, the electric field scanner is operated without the electric field generator. This may be accomplished by turning off the generator, or grounding the output of the generator so that no electric field is provided to the finger. In this mode, the scanner may be operated as a capacitance fingerprint scanner. The signal emanating from each electric field sensor is primarily representative of two things:

(a) the capacitance between an electrode, the dielectric material covering the electrode and the skin that covers the dielectric material, and
(b) the capacitance between the electrode, the dielectric material covering adjacent electrodes, and the skin that covers the dielectric material covering those adjacent portions of the dielectric material.

Ideally, the signal emanating from each electric field sensor would not be influenced by the capacitance described in item "b", and instead would be only that capacitance that is attributable to item "a".

In order to compensate for that part of the capacitance corresponding to item "b", the reading from a particular electric field sensor and the readings from adjacent electric field sensors are processed to obtain a value which is then attributed to the location of that particular electric field sensor. This process is repeated for each electric field sensor to provide and attribute a value to each electric field sensor location. These attributed values corresponding to the capacitances are used as the information representing the fingerprint.

Figure 13:
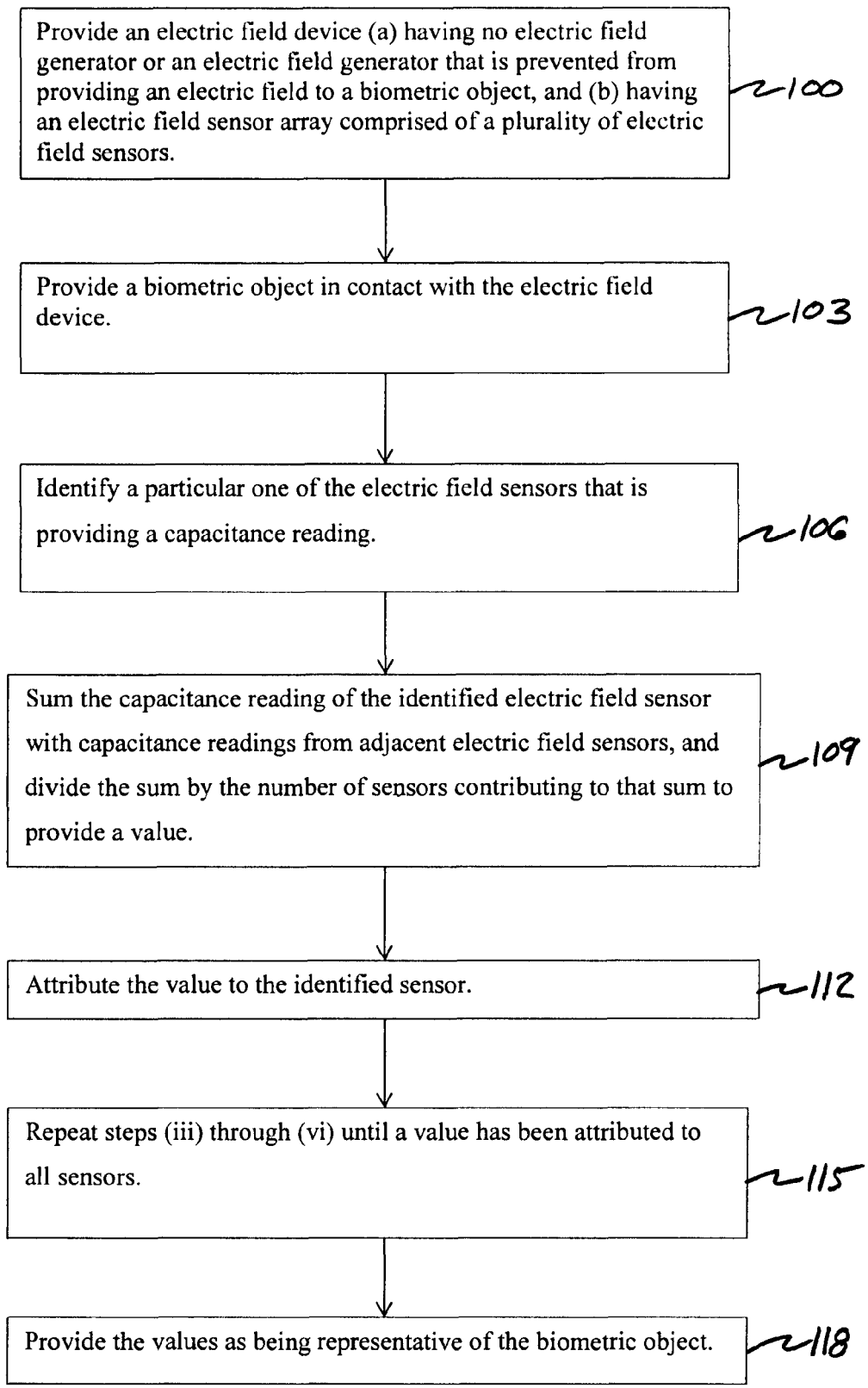
FIG. 13 is a flow chart depicting a method according to the invention.

A particular process that works well is to sum the reading of a particular electric field sensor with the readings from adjacent electric field sensors, and then divide by the number of sensors contributing to that sum. So, if a particular sensor has eight adjacent sensors, the divisor will be nine. However, if a particular sensor has five adjacent sensors, then the divisor will be six. FIG. 13 depicts such a method in flow-chart form.

In use, a device according to the invention uses electric field sensors capacitively coupled to a finger that is not being excited by an electric field generator. As the finger contacts a dielectric platen covering the array of electric field detecting and measuring circuits on a TFT array, the field is conducted through the skin of the finger and coupled through the dielectric platen to the input electrode of the electric field detecting circuit. The individual pixel circuits, each sensor being part of a pixel, on the TFT are read out via row and column addressing, and the signals are interpreted and translated into an image representation of the TFT array in order to allow for the creation of an image of the fingerprint associated with the finger that is in contact with the dielectric platen.

Figure 10:
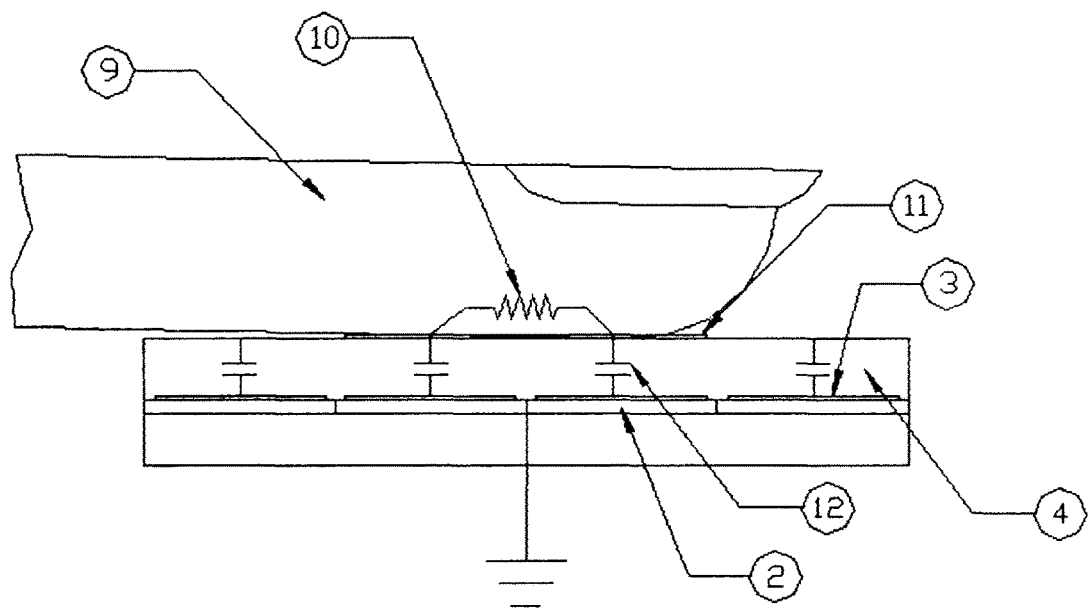
FIG. 10 is a diagram of the operation of the capacitance type fingerprint scanner.
Figure 12:
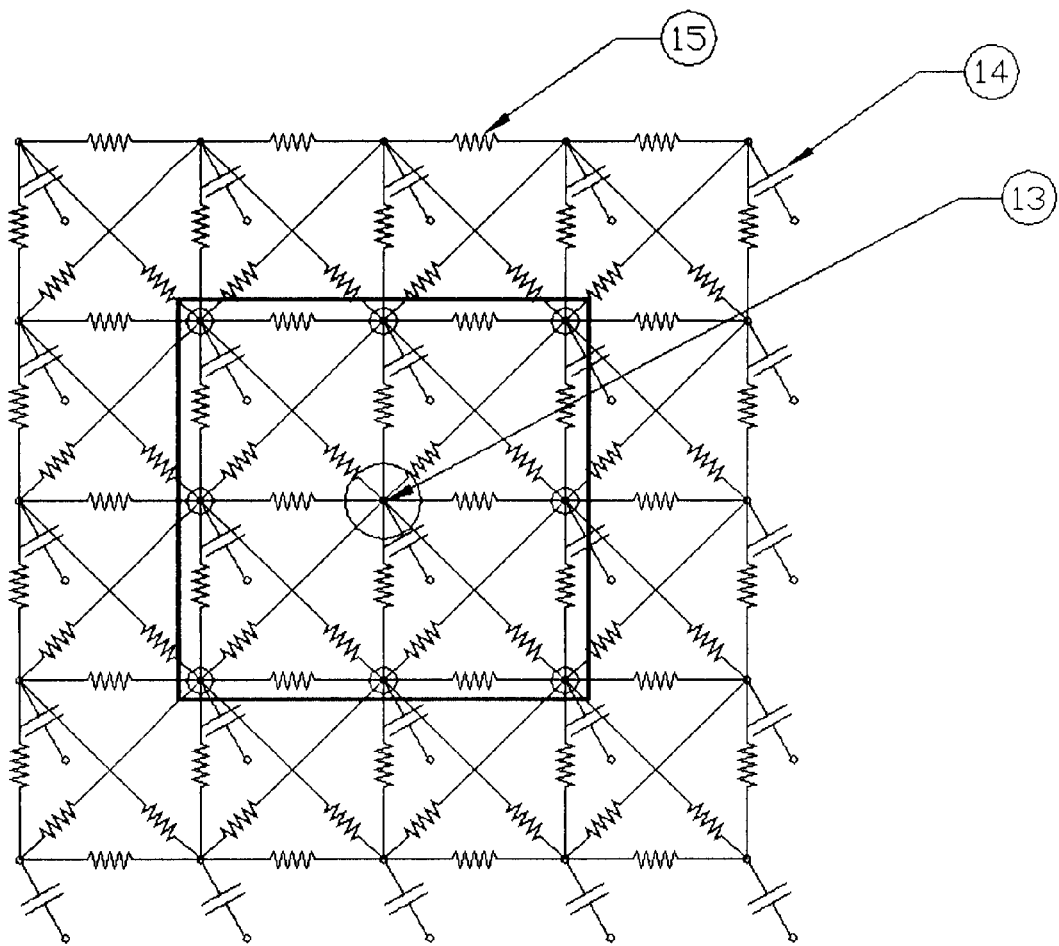
FIG. 12 depicts a schematic of the pixel capacitance skin resistance network at any multiple friction skin contact points.

Having provided an overview of a method according to the invention, a device according to the invention will be described, and in doing so additional details about the inventive method will be provided. FIG. 10 shows an electric field finger scanner without the electric field generator. The electric field device is operated without the electric field generating device 7 or antenna 6. In this case, the sensor operates as a capacitance fingerprint scanner device 8 and when the finger contacts the dielectric platen 4, the finger completes a resistance-capacitance circuit between adjacent pixel input plates using the resistance 10 of the finger 9. Since this shared charge capacitance receives contributions from multiple pixel input plates 3, the charge is distributed between sensors pixels 2 where the center pixel shares charge with each of its neighbors. This capacitive charge sharing is sufficient to maintain line sharpness and image quality across the sensor surface with the center-contacting-skin pixel receiving a share many times more (approximately 8 for most sensors) than that of any of its immediate neighbors, such as in FIG. 12. Although the actual distributed circuit extends outward in all directions and there are contributions from all of the pixels, it is considered for explanation purposes, that only the 8 (for most sensors) immediate neighboring pixels, share a connection with any pixel-of-interest 13, since the contribution from pixels outside of this region are negligible.

Figure 14:
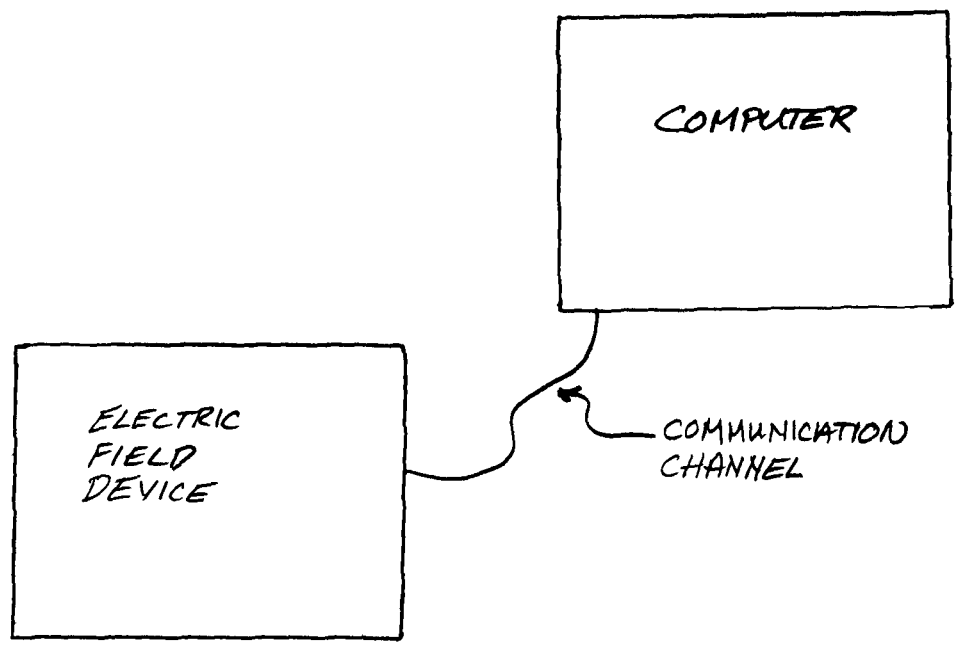
FIG. 14 is a system according to the invention.

FIG. 14 depicts a system according to the invention. In FIG. 14 there is shown the electric field device (with no electric field generator) and a computer. The computer is programmed to process the capacitance readings of the electric field sensors in the manner outlined above. Such a computer may be programmed to sum the capacitance reading of a particular electric field sensor with the readings from adjacent electric field sensors, and then divide by the number of sensors contributing to that sum. The resulting value is then attributed to that particular sensor location. This process may be carried out by the computer for all electric field sensors in order to provide a value corresponding to each sensor location. The values generated by the computer may then be used by the computer to generate an image of the fingerprint, or the values may be used to make a comparison with information in a database in order to determine whether the fingerprint matches a previously analyzed fingerprint.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A biometric scanner, comprising:
    a TFT array, including:
        an electric field generator that is prevented from providing an electric field to a biometric object or the TFT array not having an electric field generator, and having an electric field sensor array comprised of a plurality of electric field sensors, each of the electric field sensors including:
            a first capacitor;
            a diode;
            a first transistor; and
            a second transistor;
            wherein the first capacitor is configured to capacitively couple to the biometric object;
            wherein the first capacitor is in electrical series with the diode, the first transistor, and the second transistor;
            wherein a first bias is in electrical series with the diode and the first transistor; and
            wherein the second transistor is coupled to an output; and
    a computer coupled to receive capacitance readings from each output of the plurality of electric field sensors on the TFT array.

2. The biometric scanner of claim 1, wherein the computer is further programmed to create an image of the biometric object using the capacitance readings.

3. The biometric scanner of claim 1, wherein the computer is further programmed to use the capacitance readings in determining whether the biometric object matches information in a database.

4. The biometric scanner of claim 1, wherein the computer is programmed to process the capacitance readings by:
    (i) identifying a particular one of the electric field sensors that is providing a capacitance reading;
    (ii) summing the capacitance reading of the identified electric field sensor with capacitance readings from adjacent electric field sensors;
    (iii) dividing the sum by the number of electric field sensors contributing to that sum to provide a value;
    (iv) attributing the value to the identified electric field sensor; and
    (v) repeating steps (i) through (iv) until a value has been attributed to all of the electric field sensors.

5. The biometric scanner of claim 1, wherein the diode, the first transistor, and the second transistor are each separately in series with the first capacitor.

6. A method of scanning a biometric object, comprising:
    (i) providing a TFT array (a) having no electric field generator, or an electric field generator that is prevented from providing an electric field to a biometric object or the TFT array, and (b) having an electric field sensor array comprised of a plurality of electric field sensors, each of the electric field sensors including:
        a first capacitor;
        a diode;
        a first transistor; and
        a second transistor;
        wherein the first capacitor is configured to capacitively couple to the biometric object;
        wherein the first capacitor is in electrical series with the diode, the first transistor, and the second transistor;
        wherein a first bias is in electrical series with the diode and the first transistor and wherein the second transistor is coupled to an output; and (ii) capacitively coupling a biometric object to the TFT array;

(iii) receiving capacitance readings from each output of the plurality of electric field sensors on the TFT array; and (iv) determining values representative of the biometric object based upon the received capacitance readings.

7. The method of claim 6, further comprising using the received capacitance readings to generate a visual image of the biometric object.

8. The method of claim 6, further comprising using the received capacitance readings to determine whether the biometric object matches information in a database.

9. The method of claim 6, wherein determining values representative of the biometric object includes repeating the following steps until a value has been attributed to all of the electric field sensors:

identifying a particular one of the electric field sensors that is providing a capacitance reading;

summing the capacitance reading of the identified electric field sensor with capacitance readings from adjacent electric field sensors;

dividing the sum by the number of electric field sensors contributing to that sum to provide a value; and attributing the value to the identified electric field sensor.

10. The method of claim 6, wherein the diode, the first transistor, and the second transistor are each separately in series with the first capacitor.

* * * * *